(12) United States Patent
Jensen et al.

(10) Patent No.: US 10,705,210 B2
(45) Date of Patent: Jul. 7, 2020

(54) THREE-DIMENSIONAL (3-D) IMAGING WITH A ROW-COLUMN ADDRESSED (RCA) TRANSDUCER ARRAY USING SYNTHETIC APERTURE SEQUENTIAL BEAMFORMING (SASB)

(71) Applicant: B-K MEDICAL APS, Herlev (DK)

(72) Inventors: Jorgen Arendt Jensen, Horsholm (DK); Hamed Bouzari, Copenhagen (DK); Matthias Bo Stuart, Horsholm (DK)

(73) Assignee: B-K Medical ApS, Herlev (DK)

( * ) Notice: Subject to any disclaimer, the term of this patent is extended or adjusted under 35 U.S.C. 154(b) by 283 days.

(21) Appl. No.: 15/609,666

(22) Filed: May 31, 2017

(65) Prior Publication Data

US 2018/0348624 A1 Dec. 6, 2018

(51) Int. Cl.
*G01S 15/89* (2006.01)
*G10K 11/34* (2006.01)
(Continued)

(52) U.S. Cl.
CPC ........ *G01S 15/8925* (2013.01); *B06B 1/0629* (2013.01); *G01S 7/5202* (2013.01);
(Continued)

(58) Field of Classification Search
CPC ... G03B 42/06; G01S 7/5202; G01S 7/52025; G01S 7/5208; G01S 15/8925;
(Continued)

(56) References Cited

U.S. PATENT DOCUMENTS

| 5,720,291 A | * | 2/1998 | Schwartz | ................. | A61B 8/06 |
| | | | | | 600/456 |
| 5,840,032 A | * | 11/1998 | Hatfield | ................... | A61B 8/06 |
| | | | | | 600/443 |

(Continued)

FOREIGN PATENT DOCUMENTS

| WO | WO-0217296 A1 * | 2/2002 | ......... G01S 15/8979 |
| WO | 2015092458 A1 | 6/2015 | |

OTHER PUBLICATIONS

Seo CH, Yen JT. A 256 × 256 2-D array transducer with row-column addressing for 3-D rectilinear imaging. IEEE Trans Ultrason Ferroelectr Freq Control. 2009;56(4):837-847. doi:10.1109/TUFFC.2009.1107 (Year: 2009).*

(Continued)

*Primary Examiner* — Krystine E Breier
(74) *Attorney, Agent, or Firm* — Anthony M. Del Zoppo, III; Daugherty & Del Zoppo Co, LPA

(57) ABSTRACT

An ultrasound imaging system includes a probe and a console. The probe includes a row-column addressed transducer array, first beamformer configured to beamform echo signals received by the row-column addressed transducer array and produce a set of image planes for each emission with a single focus in both transmit and receive, and a first communication interface. The console includes a second complementary communication interface and a second beamformer configured to beamform the focused set of image planes and produce a three-dimensional volume of ultrasound data.

20 Claims, 6 Drawing Sheets

(51) Int. Cl.
*G01S 7/52* (2006.01)
*B06B 1/06* (2006.01)

(52) U.S. Cl.
CPC ........ *G01S 7/5208* (2013.01); *G01S 7/52025* (2013.01); *G01S 15/8927* (2013.01); *G01S 15/8993* (2013.01); *G01S 15/8997* (2013.01); *G10K 11/346* (2013.01)

(58) Field of Classification Search
CPC ............. G01S 15/8927; G01S 15/8993; G01S 15/8997; G10K 11/346
See application file for complete search history.

(56) References Cited

U.S. PATENT DOCUMENTS

| | | | | |
|---|---|---|---|---|
| 5,997,479 | A * | 12/1999 | Savord | G01S 7/52079 600/447 |
| 6,375,617 | B1 * | 4/2002 | Fraser | A61B 8/06 128/916 |
| 6,537,220 | B1 * | 3/2003 | Friemel | A61B 8/14 600/447 |
| 6,780,152 | B2 * | 8/2004 | Ustuner | A61B 8/08 600/443 |
| 7,285,094 | B2 * | 10/2007 | Nohara | G01S 7/52047 600/447 |
| 8,220,334 | B2 * | 7/2012 | Klessel | G01S 7/52028 310/322 |
| 9,386,964 | B2 * | 7/2016 | Bagge | G01S 7/52068 |
| 9,433,398 | B2 * | 9/2016 | Owen | A61B 8/4427 |
| 9,702,972 | B2 * | 7/2017 | Jensen | G01S 15/8984 |
| 9,704,474 | B2 * | 7/2017 | Hemmsen | G01S 7/5208 |
| 10,080,544 | B2 * | 9/2018 | Chiang | A61B 8/4483 |
| 10,245,005 | B2 * | 4/2019 | Freeman | G01S 7/52095 |
| 2005/0148874 | A1 * | 7/2005 | Brock-Fisher | G01S 7/52049 600/447 |
| 2006/0241461 | A1 * | 10/2006 | White | A61B 8/06 600/454 |
| 2010/0168576 | A1 * | 7/2010 | Poland | A61B 8/00 600/443 |
| 2014/0050048 | A1 * | 2/2014 | Jensen | G01S 7/52038 367/11 |
| 2014/0121521 | A1 * | 5/2014 | Poland | A61B 8/145 600/447 |
| 2015/0359512 | A1 * | 12/2015 | Boctor | G01S 15/8997 600/444 |
| 2016/0228090 | A1 * | 8/2016 | Boctor | A61B 5/0095 |
| 2018/0059229 | A1 * | 3/2018 | Di Ianni | G01S 15/8997 |
| 2018/0199918 | A1 * | 7/2018 | Tsushima | G01S 15/8997 |
| 2018/0242953 | A1 * | 8/2018 | Ikeda | G01S 15/8997 |
| 2018/0271493 | A1 * | 9/2018 | Jensen | A61B 8/4494 |
| 2018/0271498 | A1 * | 9/2018 | Guenther | A61B 8/5269 |
| 2018/0348624 | A1 * | 12/2018 | Jensen | G01S 7/5202 |

OTHER PUBLICATIONS

Di Ianna, et al., U.S. Appl. No. 15/252,632, filed Aug. 31, 2016, entitled "Vector Velocity Estimation Using Transverse Oscillation (to) and Synthetic Aperture Sequential Beamforming (SASB)," not yet published.

Bouzari, et al., PCT Application Serial No. PCT/IB2016/053367, filed Jun. 8, 2016, entitled "Row-Column Addressed 2-D Array With a Double Curved Surface," not yet published.

Jensen, et al., U.S. Appl. No. 15/468,715, filed Mar. 24, 2017, entitled "A Row-Column Addressed Array with N Rows and N Columns and With Less Than 2N Electrical Connections," not yet published.

C.E. Morton and G.R. Lockwood, "Theoretical assessment of a crossed electrode 2-D array for 3-D imaging" in Proc. IEEE Ultrason. Symp., 2003, pp. 968-971.

J. Kortbek, J.A. Jensen and K.L. Gammelmark, "Sequential beamforming for synthetic aperture imaging" Ultrasonics, vol. 53, No. 1, pp. 1-16, 2013.

Simon Holbek, et al., PCT Application Serial No. PCT/IB2016/056817, filed Nov. 11, 2016, entitled "3D Imaging Using Row-Column Addressed Transducer Arrays: Two-Way Focusing and Volumetric 3-D VFI," not yet published.

Bouzari, et al., PCT Application Serial No. PCT/IB2016/053367, entitled Row-Column Addressed 2-D Array Vith a Double Curved Surface, filed Jun. 8, 2016 and not yet published.

* cited by examiner

THREE-DIMENSIONAL (3-D) IMAGING WITH A ROW-COLUMN ADDRESSED (RCA) TRANSDUCER ARRAY USING SYNTHETIC APERTURE SEQUENTIAL BEAMFORMING (SASB)

TECHNICAL FIELD

The following generally relates to ultrasound imaging and more particularly to 3-D imaging with an RCA transducer array using SASB.

BACKGROUND

An ultrasound imaging system includes a transducer array with a one-dimensional (1-D) or a two-dimensional (2-D) array of transducing elements. A 2-D transducer array has been employed for 3-D real-time scanning of a volume by arranging the transducer elements in a rectangular grid and steering the beam in the lateral and elevation directions to acquire data of the volume. Where the rectangular grid has an N×N geometry, the total number of elements is $N^2$. To individually control each of the elements, a direct connection is made to each element.

Channel count can be reduced, while maintaining aperture size, through a sparse array, in which only a subset of the elements is active at the same time. However, these arrays have a reduced signal-to-noise ratio (SNR) and introduce higher side lobes and/or grating lobes on severe sparseness. This results in degradation of image contrast and constrains the diagnostic value of the exam. Another approach includes operating the N×N array as an RCA array. For this, the elements are addressed group-wise by row and column index, and each row and column of elements acts as one large element. A fully addressed RCA N×N array would require only 2N channels.

However, addressing individual elements or rows and columns of elements leads to practical challenges in producing the interconnections, sampling, and real-time processing of a large volume of data, and a large number of wires results in a large cable from the transducer to the scanner. Hence, there is an unresolved need for an approach that further reduces the number of channels between the probe and the console for real-time 3-D imaging, e.g., for probes that transmit data to a console using wired and/or wireless technologies.

SUMMARY

Aspects of the application address the above matters, and others.

In one aspect, an ultrasound imaging system includes a probe and a console. The probe includes a row-column addressed transducer array, first beamformer configured to beamform echo signals received by the row-column addressed transducer array and produce a set of image planes for each emission with a single focus in both transmit and receive, and a first communication interface. The console includes a second complementary communication interface and a second beamformer configured to beamform the focused set of image planes and produce a three-dimensional volume of ultrasound data.

In another aspect, a method includes transmitting an ultrasound signal with a group of elements of a row-column addressed transducer array of an ultrasound probe of an ultrasound imaging system, and receiving echo signals with one or more orthogonal groups of elements of the row-column addressed transducer array. The method further includes beamforming, in the ultrasound probe, signals from each group producing a set of image planes focused in transmit and receive using synthetic aperture sequential beamforming, and transmitting the set of focused image planes from the probe to a console of the ultrasound imaging system. The method further includes beamforming the set of focused image planes to produce a three-dimensional volume of the scanned object using synthetic aperture sequential beamforming, and visually displaying the three-dimensional volume.

In another aspect, a non-transitory computer readable storage medium is encoded with computer readable instructions. The computer readable instructions, when executed by a processor of a computing system, cause the processor to: receive a set of image planes beamformed in an ultrasound probe of an ultrasound imaging system including a row-column addressed transducer array, beamform, in a console of the ultrasound imaging system, the set of focused image planes to produce a three-dimensional volume of the scanned object using synthetic aperture sequential beamforming, and visually display the three-dimensional volume.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which.

DETAILED DESCRIPTION

The following describes a real-time 3-D ultrasound imaging approach using an RCA array and a beamforming approach based on synthetic aperture sequential beamforming (SASB). In general, the beamforming is divided into two-stages with different beamformers, one in the probe and one in the console. The first stage (probe) beamformer processes the channel data from the RCA array and generates a set of B-mode image planes using a single focal line in both transmit and receive. This set is transmitted from the probe to the console. The second stage (console) beamformer process this set and generates a whole rectilinear volume. With the low channel count required to transfer the set from the probe to the console, this approach is well-suited for real-time 3-D imaging using wireless probes and/or high frequency probes.

Figure 1:
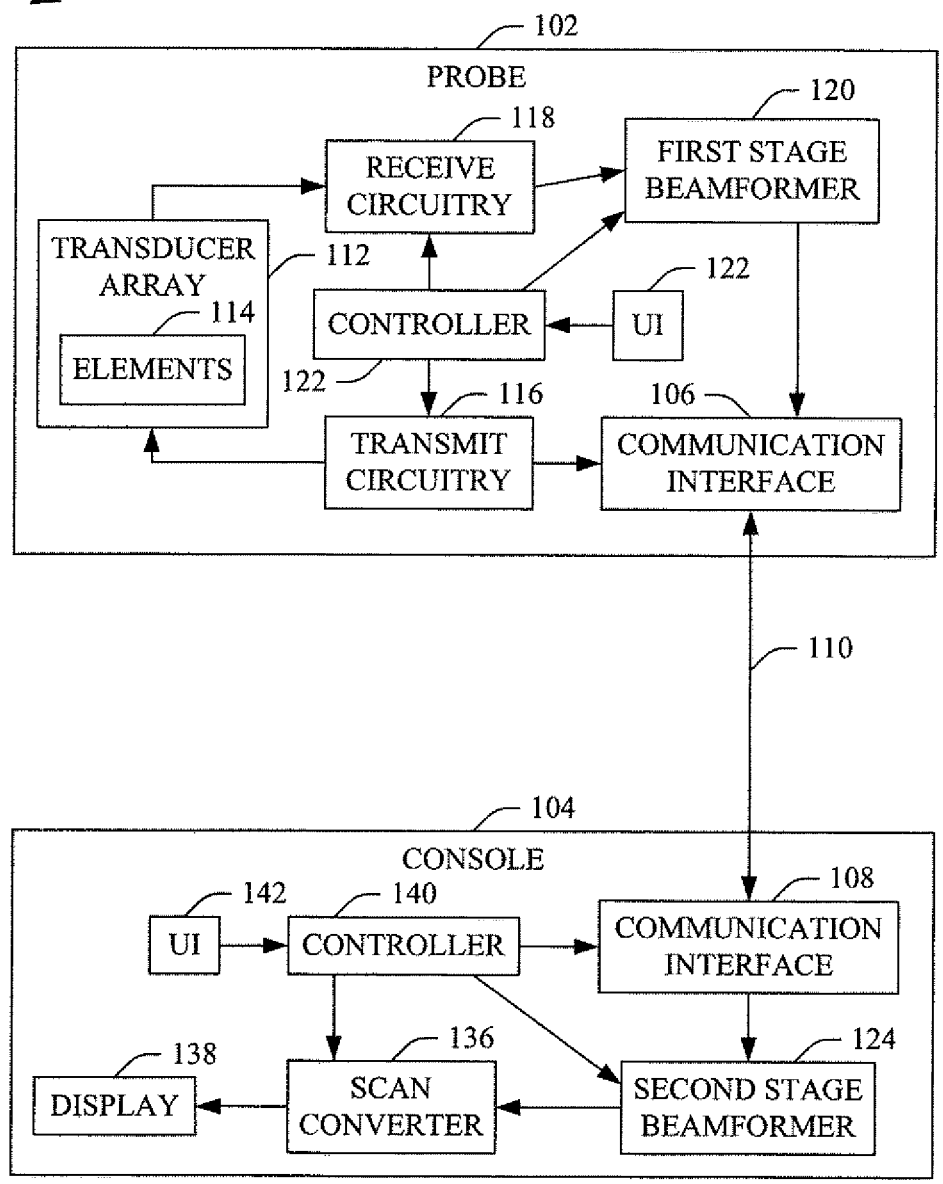
FIG. 1 schematically illustrates an example ultrasound imaging system.

FIG. 1 schematically illustrates an example system 10, which includes an ultrasound imaging system 100.

The ultrasound imaging system 100 includes a probe 102 and console 104. The probe 102 includes a console communication interface ("communication interface") 106, and the console 104 includes a probe communication interface ("communication interface") 108. The illustrated communication interfaces 106 and 108 communicate with each other via a communication channel 110. In one instance, the communication channel 110 is a wireless channel. In another instance, the communication channel 110 includes a wire and/or other physical electrical conductor. The communication can be direct or through another device such as over a network.

The probe 102 includes a 2-D transducer array 112 configured for RCA. The 2-D array 112 includes a plurality of detector elements 114 arranged in a N×M matrix of N rows and M columns, where N and M are positive integers and N=M or N≠M (e.g., N>M or N<M). Examples of square arrays include 64×64, 192×192, 256×256, 512×512 and/or other arrays, including larger and/or smaller arrays. Examples also include non-square arrays such as rectangular, circular, irregular and/or other shaped arrays. The elements can be piezoelectric (PZT), capacitive micromachined ultrasonic transducer (CMUT) elements, and/or other transducing elements.

Figure 2:
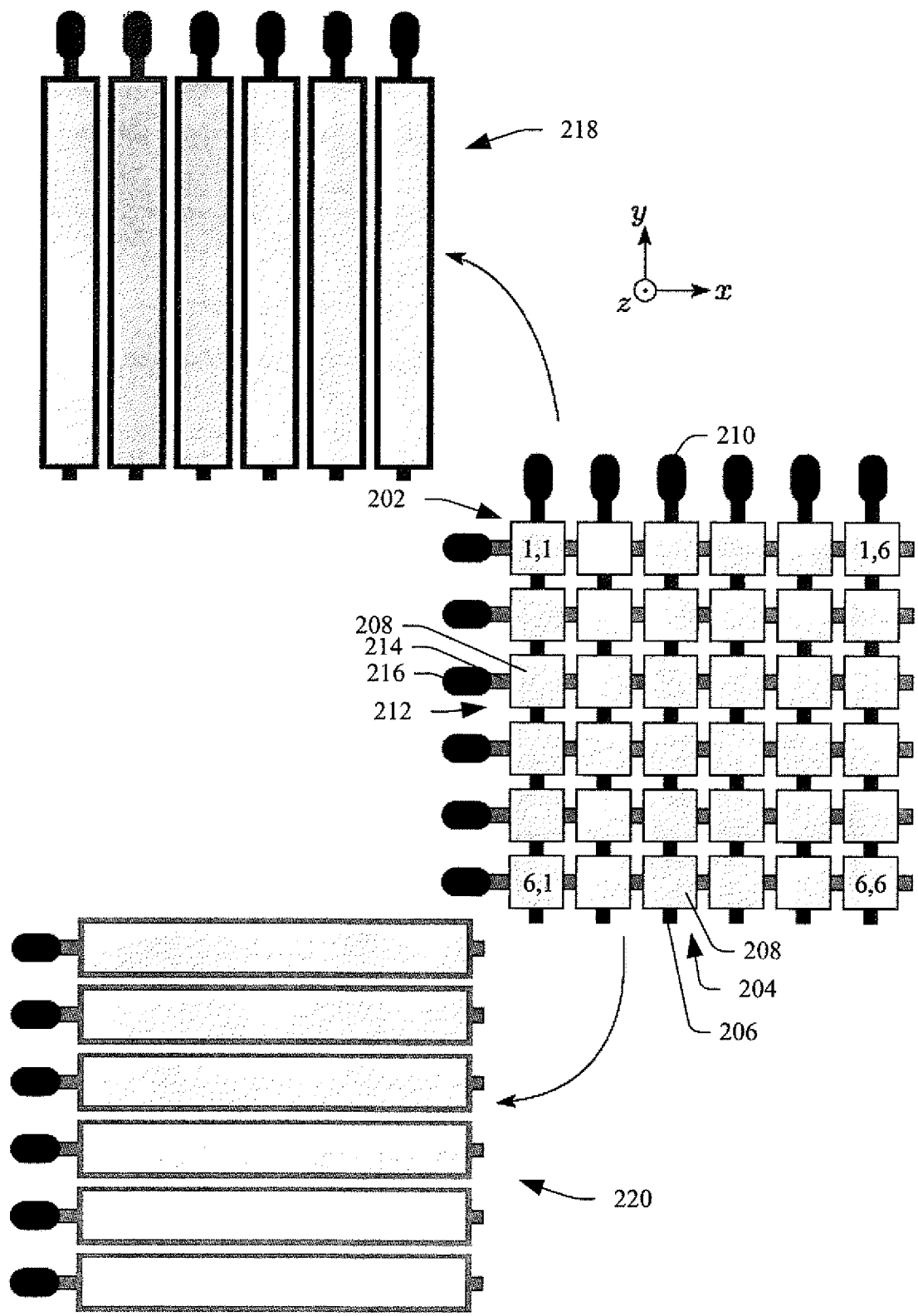
FIG. 2 schematically illustrates an example RCA array.

Briefly turning to FIG. 2, an example 6×6 (N=M=6) RCA array 202 is schematically illustrated. Each column 204 includes an electrically conductive trace 206 in electrical communication with each element 208 of the column 204, with an electrode 210 in electrical communication with the electrically conductive trace 206. Each row 212 includes an electrically conductive trace 214 in electrical communication with the elements 208 of the row 212, with an electrode 216 in electrical communication with the electrically conductive trace 214. RCA effectively transforms the 36-element 6×6 2-D array 202 into a 6-element 1-D column array 218 and an orthogonal 6-element 1-D row array 220. This effectively reduces the number of element channels from $N^2$ to 2N.

A suitable RCA array is described in patent application Ser. No. 15/252,632, entitled "Vector Velocity Estimation Using Transverse Oscillation (TO) and Synthetic Aperture Sequential Beamforming (SASB)," and filed on Aug. 31, 2016, the entirety of which is incorporated by reference herein. Another suitable RCA array is described in patent application Ser. No. 15/468,715, entitled "A Row-Column Addressed Array with N Rows and N Columns and With Less Than 2N Electrical Connections," and filed on Mar. 24, 2017, the entirety of which is incorporated by reference herein. In patent application Ser. No. 15/468,715, a pair of a row and a column share a front-end circuit.

Furthermore, the transducing elements 208 may include integrated apodization, which may be identical or different for the individual elements. An example is described in patent application PCT/IB2013/002838, filed Dec. 19, 2013, and entitled "Ultrasound Imaging Transducer Array with Integrated Apodization," the entirety of which is incorporated herein by reference. Furthermore, the 2-D array 202 may have flat 1-D arrays, one curved 1-D array, two curved 1-D arrays, a single curved lens in front of or behind one of the 1-D arrays, a double curved lens in front of or behind the 1-D arrays, a combination of at least one curved 1-D array and at least one curved lens, etc. An example is described in patent application PCT/IB2016/053367, filed Jun. 8, 2016, and entitled "Row-Column Addressed 2-D array with a Double Curved Surface," the entirety of which is incorporated herein by reference.

In FIG. 2, each row and column may have its own front-end circuit. For example, the electrode 210 is in electrical communication with its own front-end circuit (not visible), and the electrode 216 is in electrical communication with its own front-end circuit (not visible). In a variation, pairs of rows and columns may share front-end circuit, as described in application Ser. No. 15/468,715. With a shared front-end circuit, the electrodes 210 and 216 are both in electrical communication with a same switch (not visible), which switches between the electrodes 210 and 216 for transmitting and receiving. The switch can be part of the shared front-end circuit and/or separate therefrom. This configuration further reduces the number of channels from 2N to N.

Returning to FIG. 1, the probe 102 further includes transmit circuitry 116 configured to generate a set of pulses that are conveyed to the transducer array 112. The set of pulses excites a set of the transducer elements 114, which causes the elements 114 to emit ultrasound signals. The probe 102 further includes receive circuitry 118 configured to receive the electrical signals. The receive circuitry 118 may amplify, filter, convert analog signals to digital signals, and/or otherwise condition and/or pre-preprocess the signals. An example transmit and receive sequence for real-time 3-D imaging with the SASB based approach is described in greater detail below.

The probe 102 includes a first stage beamformer 120, which is configured to process, via delay and sum beamforming, the electrical signals for each emission using a fixed focus and a single delay-profile, producing a set of B-mode image planes. The focal lines, in one instance, are at a same depth, and, for each emission, a number of focal lines perpendicular to the transmit focal line is created. The first stage beamformer 120 employs an algorithm, which is based on a SASB. An example algorithm for computing the single delay-profile is described in greater detail below. The set of B-mode image planes is transmitted to the console 104 via the communication interfaces 106 and 108. Since the first stage beamformer 120 calculates only a single set of delay values, the first stage beamformer 120 can be of low complexity. In addition, because of the beamforming, data from all of the column (or row) elements are not transmitted to the console 104, and less than 2N channels (or less than N channels when using the RCA of patent application Ser. No. 15/468,715) are needed, for creating a 3-D volume. As such, the system 10 is well-suited for real-time 3-D wireless imaging. Patent application Ser. No. 15/468,715 describes wireless frame rates, wireless technologies, and examples of SASB algorithms.

The probe 102 further includes a probe controller ("controller") 122, which is configured to control the transmit circuitry 116, the receive circuitry 118, the first stage beamformer 120, and/or the probe wireless communication interface 106. Such control can be based on a current mode of operation (e.g., B-mode, real-time 3-D with SASB, etc.). The probe 102 includes a probe user interface (UI) 142. The UI 142 may include an input device (e.g., a button, a slider, a touch surface, etc.) and/or an output device (e.g., a visual and/or audible, etc.).

The console 104 includes a second stage beamformer 124 configured to process the set of B-mode image planes produced by the first stage beamformer 120, producing a number of new image planes to generate 3-D data for the entire scanned volume. In a variation, the second stage beamformer 124 is remote from the imaging system 100, e.g., in a separate computing device. The console 104 further includes a scan converter 136 that scan converts the image planes, converting the image planes into the coordinate system of a display 138, which visually displays the 3-D data.

The console 104 further includes a console controller ("controller") 140, which is configured to control the communication interface 108, the second stage beamformer 124, and/or the scan converter 136. Such control can be based on a current mode of operation (e.g., B-mode, real-time 3-D with SASB, etc.). The console 104 includes a console user interface (UI) 142, which may include an input device (e.g., a button, a slider, a touch surface, etc.) and/or an output device (e.g., a visual and/or audible, etc.).

It is to be appreciated that the beamformers 120 and 124 and/or other components of the imaging system 100 can be implemented via hardware and/or a processor (e.g., a microprocessor, central processing unit (CPU), etc.) executing one or more computer readable instructions encoded or embedded on a computer readable storage medium (which excludes transitory medium) such as a physical memory device. The processor can additionally or alternatively execute computer readable instructions carried by transitory medium such as a carrier wave, a signal, or other transitory medium.

Turning to FIGS. 3-7, a non-limiting example for real-time 3-D imaging using the RCA 2-D transducer array 112 with the SASB based beamforming is described.

Figure 3:
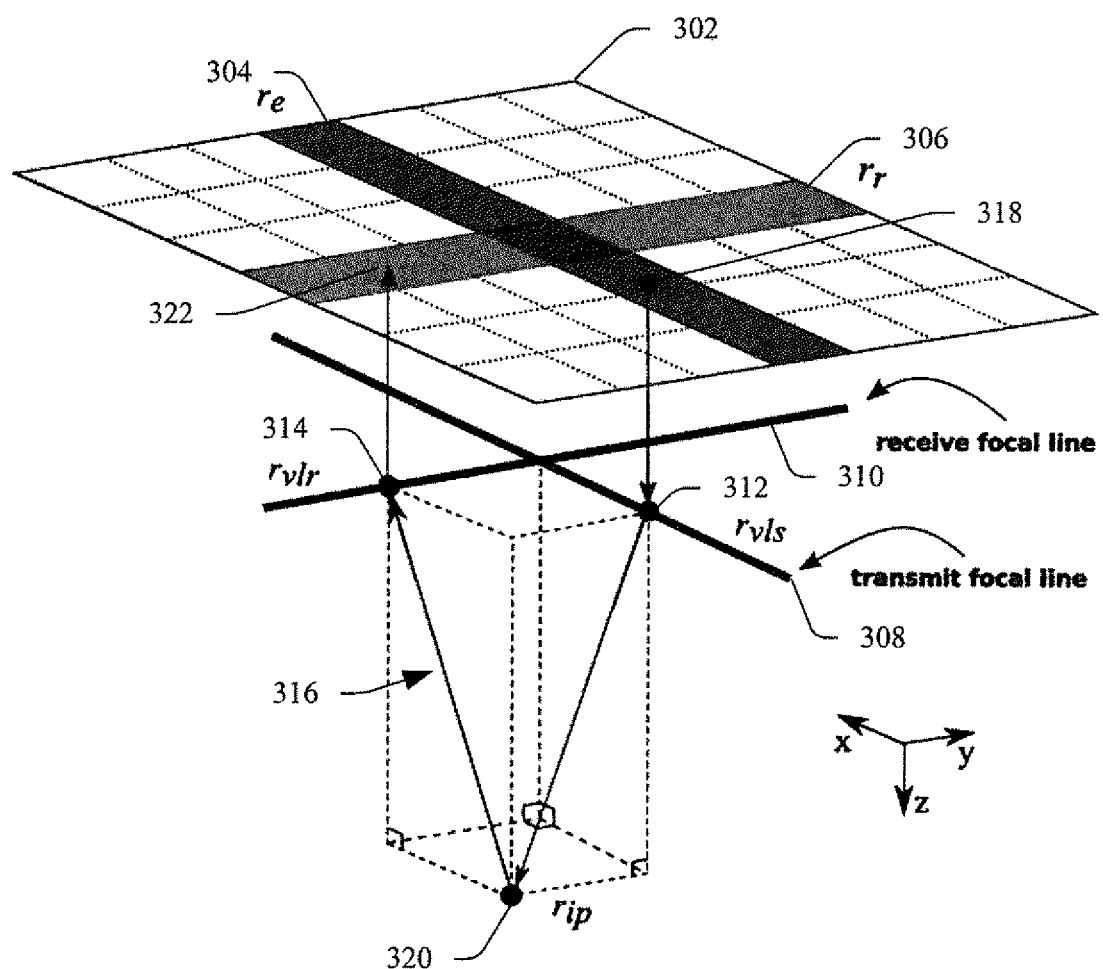
FIG. 3 shows an approach to calculate receive time delays from a time-of-flight path.

FIG. 3 describes an approach for calculating a delay for the first stage beamformer 120. In FIG. 3, a sub-portion of the 2-D array 112 is shown. A group 304 of (column or row) elements $r_e$ transmits, and a group 306 of (row or column) elements $r_r$ (orthogonal to the group 304) receives. A transmit focal line 308 is a virtual line source (VLS) emitting a cylindrical wave front spatially confined by an opening angle, and a receive focal line 310 is a virtual line receiver (VLR) receiving scatterers. The VLS and VLR include virtual row and column transducer elements (VEs).

The focusing delays for the first stage beamformer 120 are computed from a round trip time-of-flight (TOF) through a TOF path, which is a propagation time of an emitted wave in its path from a transmit origin of the array 302, to an image point (IP) of interest, and back to a receiver of the array 302. A delay value $t_d$ can be calculated as shown in EQUATION 1:

$$t_d = \frac{d_{tof}}{c}, \qquad \text{EQUATION 1}$$

where $d_{tof}$ represents a length of a TOF path 316, and c is the speed of sound. In FIG. 3, for virtual transmit and receive elements $\vec{r}_{vls}$ 312 and $\vec{r}_{vls}$ 314, the TOF is calculated along the path 316 from an emit element $\vec{r}_e$ 318, to the virtual emit element $\vec{r}_{vls}$ 312, to an image point (IP) $\vec{r}_{ip}$ 320, to the virtual receive element $\vec{r}_{vlr}$ 314, and to a receive element $\vec{r}_r$ 322. In this example, the elements $\vec{r}_e$ 318 and $\vec{r}_r$ 322 receptively are the elements of the groups $r_e$ 304 and $r_r$ 306 with shortest distances to the virtual elements $\vec{r}_{vls}$ 312 and $\vec{r}_{vlr}$ 314.

In this example, the length of the TOF path 316 $d_{tof}$ is calculated as shown in EQUATION 2:

$$d_{to} = |\vec{r}_{vls} - \vec{r}_e| \pm |\vec{r}_{ip} - \vec{r}_{vls}| \pm |\vec{r}_{vlr} - \vec{r}_{ip}| \pm |\vec{r}_r - \vec{r}_{vlr}|, \qquad \text{EQUATION 2:}$$

where each operation |·| calculates a length of a vector, and the "±" corresponds to whether the image position (IP) $\vec{r}_{ip}$ 320 is above or below (as shown in FIG. 3) the VLS or VLR 308 and 310. In EQUATION 2, the differences between the individual channel delays do not change with the image position $\vec{r}_{ip}$ 320 since the term involving the receive elements ($|\vec{r}_r - \vec{r}_{vlr}|$) does not depend on $\vec{r}_{ip}$.

Figure 4:
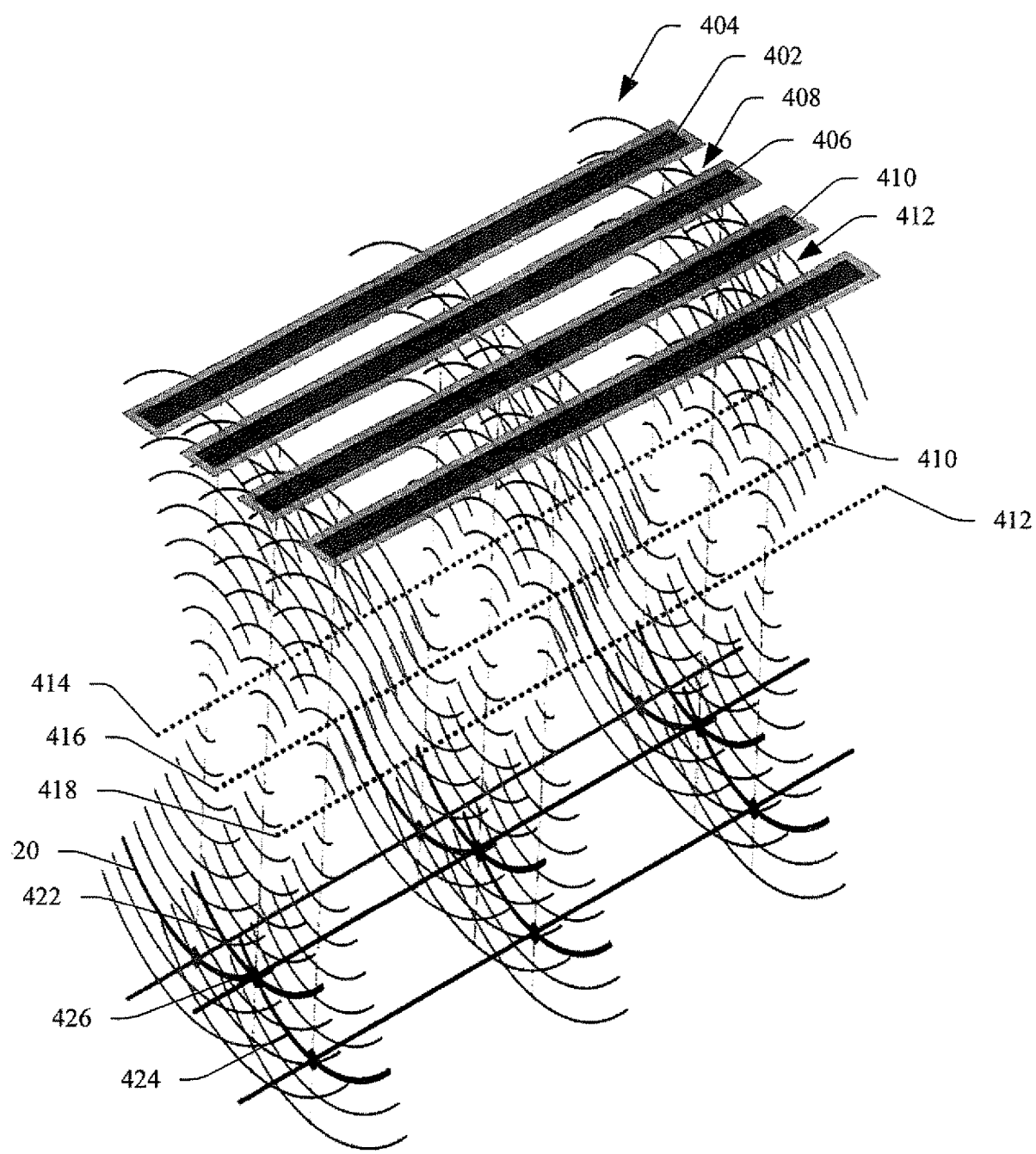
FIG. 4 shows example row or column elements, wave propagation, and image planes.

FIG. 4 schematically illustrates focal lines for the first stage beamformer 120 for three different emissions via three different groups of elements. It is to be understood that only three emissions are shown for explanatory purposes, clarity, and sake of brevity. Focal lines for receive can be similarly explained, but with groups of elements orthogonal to the illustrated groups of elements and receiving scatterers, and will not be separately shown.

A first group of elements 402 transmits a first cylindrical wave front 404, a second group of elements 406 transmits a second cylindrical wave front 408, and a third group of elements 410 transmits a third cylindrical wave front 412. Focused lines 414, 416 and 418 each comprise a plurality samples (each indicated by a "dot"). With fixed focusing, each sample contains information from spatial positions indicated by arcs 420, 422 and 424 of the cylindrical wave fronts 404, 408 and 412.

For a single sample, the information is limited by an opening angle of two planes passing through an image point and has a center in the focal line. Each sample contains information from many image points indicated by the arcs 420, 422 and 424, but only from one common image point (e.g., an image point 426 in FIG. 4), which is where the arcs 420, 422 and 424 intersect. In general, a single image point is therefore represented in multiple image planes from the first stage beamformer 120 obtained from multiple emissions.

Figure 5:
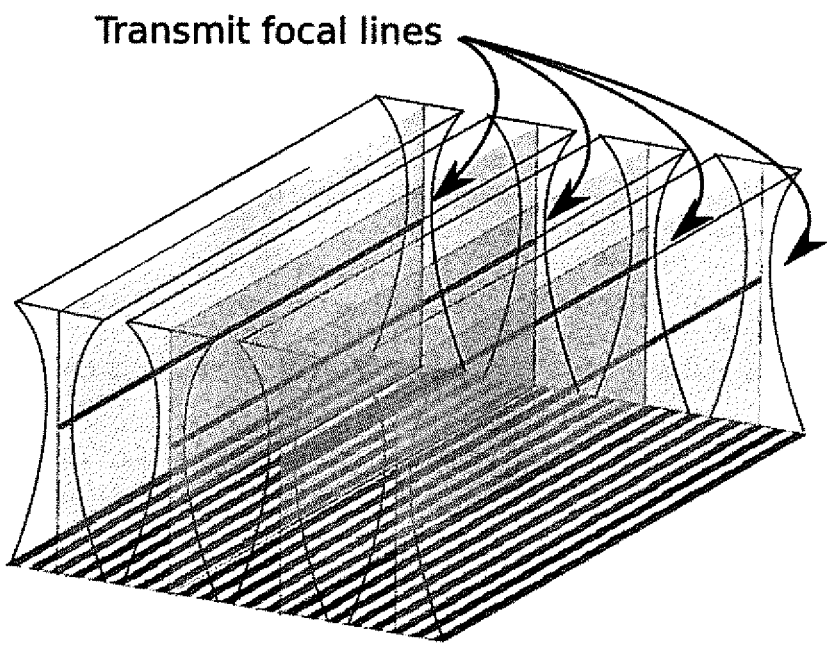
FIG. 5 shows a geometrical representation of fixed transmit focal lines.
Figure 6:
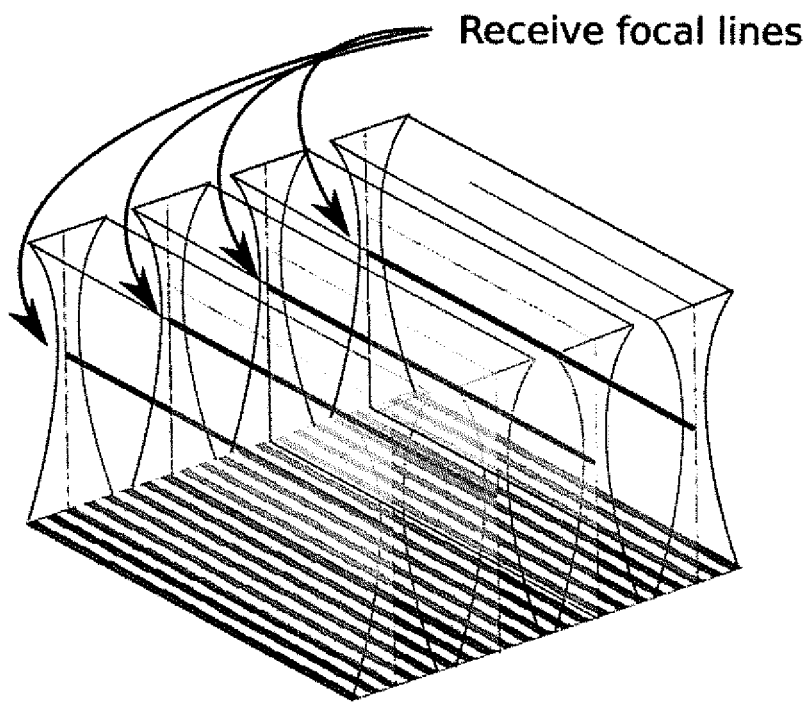
FIG. 6 shows a geometrical representation of fixed receive focal lines.

FIGS. 5 and 6 respectively represent a geometrical orientation of four transmit and receive focal lines for creating a 3-D volume. In one instance, the sequence is transmit once with a column (or row) and receive with one of the rows (or columns), repeat for each receive row (or column), and then repeat for each transmit column (or row). In another instance, the sequence is transmit once with a column (or row) and receive with two of the receive rows (or columns), transmit once another column (or row) and receive with the other two of the receive rows (or columns), and repeat for the two remaining transmit columns (or rows).

In another instance, the sequence is transmit once with a column (or row) and receive on all four rows (or columns), and repeat for each column (or row). In this case, there will be one signal for each receive row (or column), four signals for each transmit column (or row), and sixteen total signals. That is, the first stage beamforming 120 will generate sixteen image planes for this sequence. The probe 102 transmits these sixteen signals to the console 104, where they are further processed with the second stage beamforming 124 to produce a higher resolution volume. Without the first stage beamforming, the probe 102 would instead have to transmit all of the channel data.

For example, using a 192+192 λ/2 pitch 3 MHz RCA array, imaging down to a depth of 15 cm for every emission requires 195 μs and considering the 192 single element emissions and receiving single element data per emission corresponds to a volume rate of 0.14 Hz. However, transmitting all the receive channel data in parallel back to scanner per emission corresponds to a volume rate of 26 Hz. The volume rates can be improved using SASB first stage beamforming by transmitting and receiving, for example, 20 beamformed planes, in this way the volume rate for the case where the receive data is transmitted sequentially back to the scanner per emission becomes 12 Hz and for transferring the receive data in parallel per emission back to the scanner, the volume rate becomes 256 Hz. The increment in the volume rate acquisition and fewer number of channel data transferred back to the scanner can effectively increase the accuracy by lowering the standard deviation for flow estimation.

The virtual receive planes can be placed with a distance between corresponding to the width of the first stage point spread function. Its width is given by FWHM=λF #. The F # is defined as the ratio of the VLS or VLR radial distance from the center of the array to the width of the active aperture. The active aperture can be smaller or equal to the physical size of the array. The width of the aperture is N λ/2 and assuming a rectangular imaging area, the number of planes needed is:

$$m = \frac{N\frac{\lambda}{2}}{\lambda F\#} = \frac{N}{2F\#},$$

where N is the number of elements in each dimension of an RCA array with a λ/2 pitch. Thereby, the reduction ratio can be defined as:

$$Q = \frac{N}{m} = 2F\#.$$

For example, by transferring individual channel data of each receiving element in parallel, the total volume rate is 27 Hz when using a 192+192 RCA array with λ/2 pitch and a center frequency of 3 MHz for imaging down to a depth of 15 cm. However, by using SASB first stage beamforming inside the probe and placing the fixed VLR sources with an $f_{\#=5}$, the volume rate can increase up to 10 times, i.e., 270 Hz.

The second stage beamformer 124 constructs a higher resolution sample by selecting a sample from each of the B-mode planes generated by the first stage beamformer 120 that contains information from the spatial position of the image point and summing a weighted set of these samples. The second stage beamformer 124 constructs a higher resolution image point at $\vec{r}_{ip}$=(x, y, z) as a sum over samples from K(z) contributing emissions as shown in EQUATION 3:

$$h(\vec{r}_{ip}) = \Sigma_{l=1}^{L(z)} \Sigma_{k=1}^{K(z)} W(x_k, z) W'(y_l, z) S_{lk}(Z_{lk}),$$

where W and W' are dynamic apodization functions, $S_{lk}$ is a spatial signal from the output of the first stage beamformer 120 for emission k and reception l, and $Z_{lk}$ is a depth of the contributing sample.

W and W' control the weighting of the contribution from each emission and reception, and are functions of the axial position z of the image point since the number of contributing emissions and receptions K(z) and L(z) increase with range. The variable $Z_{lk}$ is dependent on the focusing of the first stage beamformer 120 and can be calculated as shown in EQUATION 4:

$$Z_{lk} = |\vec{r}_{vls_k} - \vec{r}_{e_k}| \pm |\vec{r}_{ip} - \vec{r}_{vls_k}| \pm |\vec{r}_{vlr_l} - \vec{r}_{ip}| \pm |\vec{r}_{r_l} - \vec{r}_{vlr_l}|.$$

where the sub-indices k and l respectively correspond to emission number k and reception number l.

Figure 7:
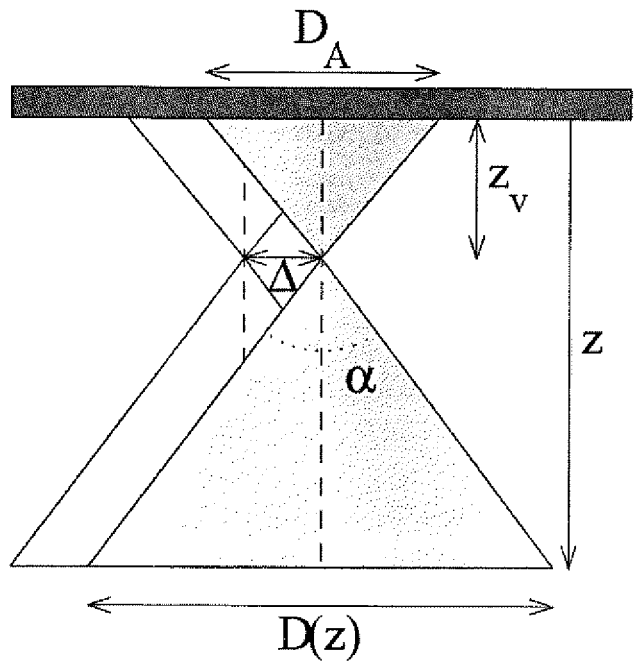
FIG. 7 shows a geometry model of emitted wave fields from two consecutive emissions.

FIG. 7 shows a geometry model for two consecutive emissions. The VE's of the contributing emissions and receptions form synthetic apertures, and K(z) and L(z) are measures of the size of the synthesized aperture. Since K and L increase linearly with range within the boundary of the physical transducer, they facilitate a range independent lateral resolution. The terms K(z) and L(z) can be calculated as shown in EQUATION 4:

$$K(z) = \frac{D(z)}{\Delta} = \frac{2(z-z_v)\tan\left(\frac{\alpha}{2}\right)}{\Delta}, \qquad \text{EQUATION 4}$$

where D(z) is a lateral width of a wave field at depth z, Δ is a distance between two VE's of two consecutive emissions, and α is an opening angle of the VE. The opening angle can be computed as shown in EQUATION 5:

$$\alpha = 2\arctan\left(\frac{1}{2F\#}\right), \qquad \text{EQUATION 5}$$

where $$F\# = \frac{z_v}{D_a},$$

and $D_a$ is a size of a sub-aperture. The opening angle α is an angular span for which a phase of a wave field can be considered constant.

The variable z determines the number of planes from the first stage beamformer 120 which can be added in the second stage beamformer 124 for an image point at the depth z. In general, the second stage beamformer 124 computes a single high resolution image point by extracting information from all of the image planes generated by the first stage beamformer 120 that contain information from that image point.

At greater depth, K(z) will eventually exceed the number of available planes from the first stage beamformer 120. At depths beyond this point the synthesized aperture will no longer increase with depth and the lateral resolution will no longer be range independent. Furthermore, the number of emissions that can be applied in the sum in EQUATION 3 decreases as the lateral position of the image point moves away from the center. The synthesized aperture decreases for image planes near the edges, and the lateral resolution is, thus, laterally dependent.

Grating lobes arise at a combination of a sparse spatial sampling and wave fields with large incident angles. The input to the second stage beamformer 124 are the image planes from the first stage beamformer 120, and the construction of these planes impacts grating lobes. The VE's from a virtual array and the distance (Δ) between the VE's determines a lateral spatial sampling. The range of incident angles to the virtual array can be determined by the opening angle α of the VE.

By restricting a, a sample of image line produced the first stage beamformer 120 only contains information from wave fields with incident angles within α. The grating lobes can be avoided by adjusting either of these parameters. If λ=c/$f_0$, where $f_0$ is a center frequency, the narrow band condition for avoiding grating lobes can formulated as shown in EQUATION 6:

$$F\# = \frac{\Delta}{\lambda/2}.\qquad\text{EQUATION 6}$$

The above is described for fixed focal lines. It is to be understood that the above can also be utilized with focal lines dynamically focused at each depth. For example, the above may include microbeamforming for RCA arrays, which allows for focal lines that are not fixed and can be dynamically focused at each depth. Examples of micro beamforming are described in WO/2002/017298, entitled "Ultrasonic diagnostic imaging system with dynamic microbeamforming," and filed Aug. 23, 2001, US20080262351 A1, entitled "Microbeamforming Transducer Architecture, and file Sep. 22, 2005, and US20140121521 A, entitled "Two dimensional ultrasonic diagnostic imaging system with two beamformer stages," and filed Jun. 28, 2012.

Figure 8:
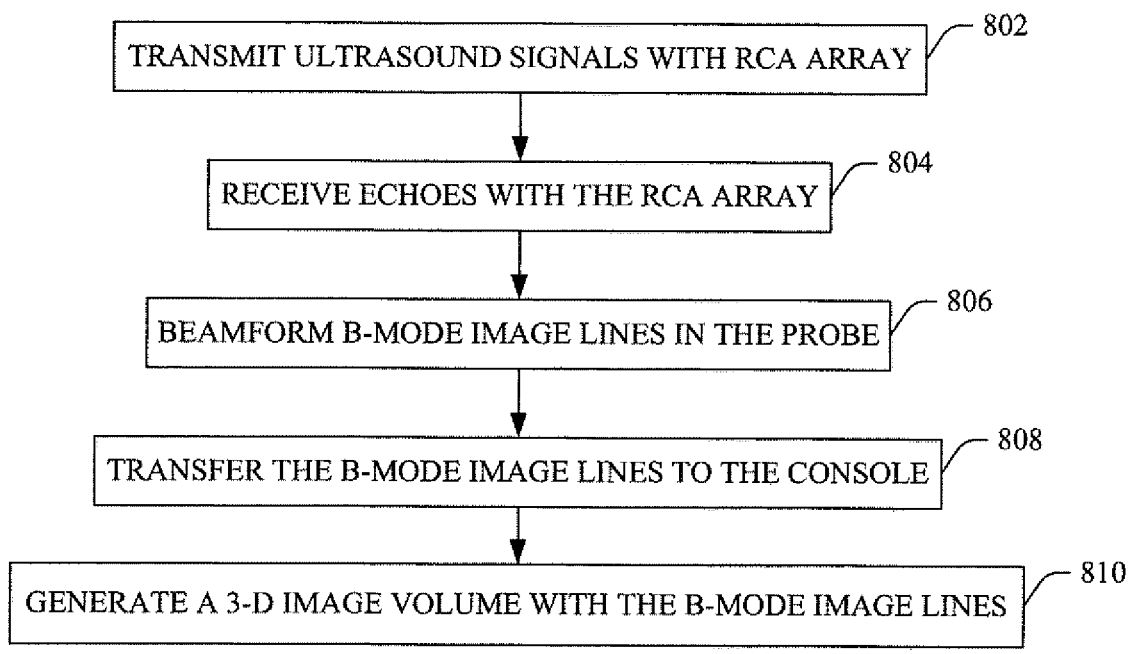
FIG. 8 illustrates a method in accordance with an embodiment herein.

FIG. 8 illustrates a method in accordance with an embodiment(s) described herein.

It is to be understood that the following acts are provided for explanatory purposes and are not limiting. As such, one or more of the acts may be omitted, one or more acts may be added, one or more acts may occur in a different order (including simultaneously with another act), etc.

At 802, the RCA array 112 is controlled to transmit ultrasound signals, as described herein.

At 804, the RCA array 112 is controlled to receive echo signals produced in response thereto, as described herein.

At 806, the first stage beamformer 120 in the probe 102 processes the received signals, generating a set of B-mode image planes, as described herein.

At 808, the probe 102 transfers the set of B-mode image planes to the console 104, as described herein.

At 810, the second stage beamformer 124 in the console 104 or other computing device processes the set of B-mode image planes, generating a 3-D image volume, as described herein.

The 3-D image can be visually presented, stored, transferred to another device, manipulated, etc.

The methods described herein may be implemented via one or more processors executing one or more computer readable instructions encoded or embodied on computer readable storage medium (which excludes transitory medium) such as physical memory which causes the one or more processors to carry out the various acts and/or other functions and/or acts. Additionally, or alternatively, the one or more processors can execute instructions carried by transitory medium such as a signal or carrier wave.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound imaging system, comprising:
 a probe, including:
  a row-column addressed transducer array;
  a first beamformer configured to beamform echo signals received by the row-column addressed transducer array and produce a set of image planes for each emission with a single focus in both transmit and receive; and
  a first communication interface; and
 a console, including:
  a second complementary communication interface; and
  a second beamformer configured to beamform the focused set of image planes and produce a three-dimensional volume of ultrasound data.

2. The system of claim 1, wherein the focused set of image planes have a first resolution and the three-dimensional volume has a second resolution, and the second resolution is higher than the first resolution.

3. The system of claim 1, wherein the second beamformer beamforms the focused set of image planes with an algorithm that is based on synthetic aperture sequential beamforming.

4. The system of claim 1, wherein the first and second complementary communication interfaces include wireless interfaces, and the first communication interface wirelessly transmits the set of image planes, which are wirelessly received by the second complementary communication interface.

5. The system of claim 1, wherein the row-column addressed transducer array includes an N×N matrix of elements, where N is a positive integer, and less than 2N channels.

6. The system of claim 1, wherein the row-column addressed transducer array includes an N×N matrix of elements, where N is a positive integer, and less than N channels.

7. The system of claim 1, wherein the row-column addressed transducer array transmits with one group of elements creating a focused transmit line, and receives with one orthogonal group of elements creating an orthogonal focused receive line.

8. The system of claim 1, wherein the row-column addressed transducer array transmits with one group of elements creating a focused transmit line, and receives with two or more orthogonal groups of elements creating two or more orthogonal focused receive lines.

9. The system of claim 1, wherein the second beamformer produces an image point by summing only samples from the sets of the image planes that contribute to the image point.

10. The system of claim 1, wherein the second beamformer produces an image point by summing a weighted set of samples from the sets of the image planes that contribute to the image point.

11. The system of claim 1, wherein the second beamformer produces an image point by summing over samples from multiple contributing emissions and receptions.

12. The system of claim 1, wherein the second beamformer produces a single image point with a sample from a first image plane corresponding to a first emission and a second image plane corresponding to a second emission.

13. A method, comprising:
 receiving echo signals with a row-column addressed transducer array of a probe of an ultrasound imaging system;
 beamforming the received echo signals with a beamformer of the probe to produce a set of image planes for each emission with a single focus in both transmit and receive;
 routing the set of image planes from the probe to a console of the ultrasound imaging system; and
 beamforming the focused set of image planes with the console to produce a three-dimensional volume of ultrasound data.

14. The method of claim 13, further comprising:
 beamforming the focused set of image planes with an algorithm that is based on synthetic aperture sequential beamforming.

15. The method of claim 13, further comprising:
transmitting with one group of elements of the row-column addressed transducer array to create a focused transmit line; and
receiving with one orthogonal group of elements to create an orthogonal focused receive line.

16. The method of claim 13, further comprising:
transmitting with one group of elements of the row-column addressed transducer array to create a focused transmit line; and
receiving with two or more orthogonal groups of elements to create two or more orthogonal focused receive lines.

17. The method of claim 13, further comprising:
summing only samples from the sets of the image planes that contribute to the image point to produce an image point.

18. The method of claim 13, further comprising:
summing a weighted set of samples from the sets of the image planes that contribute to an image point.

19. The method of claim 13, further comprising:
summing over samples from multiple contributing emissions and receptions to produce an image point.

20. The method of claim 13, further comprising:
producing a single image point with a sample from a first image plane corresponding to a first emission and a second image plane corresponding to a second emission.

* * * * *